United States Patent
Kim (10) Patent No.: US 10,120,768 B2
(45) Date of Patent: Nov. 6, 2018

(54) DATA MANAGEMENT SYSTEM AND METHOD FOR BACKUP, RECOVERY, AND MOUNT OF TIME-SERIES DATA

(71) Applicant: Machbase, Inc., Seoul (KR)

(72) Inventor: Sung Jin Kim, Seoul (KR)

(73) Assignee: MACHBASE, INC., Seoul (KR)

( * ) Notice: Subject to any disclaimer, the term of this patent is extended or adjusted under 35 U.S.C. 154(b) by 143 days.

(21) Appl. No.: 15/264,763

(22) Filed: Sep. 14, 2016

(65) Prior Publication Data

US 2017/0123938 A1    May 4, 2017

(30) Foreign Application Priority Data

Oct. 28, 2015 (KR) ................. 10-2015-0149892

(51) Int. Cl.
| | | |
|---|---|---|
| *G06F 11/00* | (2006.01) | |
| *G06F 11/14* | (2006.01) | |
| *G06F 17/30* | (2006.01) | |
| *G06F 11/16* | (2006.01) | |

(52) U.S. Cl.
CPC ...... *G06F 11/1469* (2013.01); *G06F 11/1451* (2013.01); *G06F 11/1658* (2013.01); *G06F 17/30584* (2013.01); *G06F 17/30958* (2013.01); *G06F 2201/80* (2013.01); *G06F 2201/805* (2013.01); *G06F 2201/84* (2013.01)

(58) Field of Classification Search
CPC ............ G06F 11/1451; G06F 11/1469; G06F 11/1458; G06F 11/1658
See application file for complete search history.

(56) References Cited

U.S. PATENT DOCUMENTS

| | | | | |
|---|---|---|---|---|
| 6,505,216 B1* | 1/2003 | Schutzman | ......... | G06F 11/1456 |
| 8,949,188 B2* | 2/2015 | Pafumi | ............... | G06F 11/1415 707/640 |
| 9,195,727 B2* | 11/2015 | Graefe | ................ | G06F 11/1451 |
| 2010/0077160 A1* | 3/2010 | Liu | ........................ | G06F 3/0482 711/162 |
| 2014/0214767 A1* | 7/2014 | Graefe | ............. | G06F 17/30575 707/645 |

FOREIGN PATENT DOCUMENTS

| | | |
|---|---|---|
| JP | 2008-171241 A | 7/2008 |
| JP | 2010-152707 A | 7/2010 |
| KR | 10-2001-0004069 A | 1/2001 |

* cited by examiner

*Primary Examiner* — Charles Ehne
(74) *Attorney, Agent, or Firm* — Sughrue Mion, PLLC (57) ABSTRACT

A data management system for backup, recovery, and mount of a partition including a specific number of records recorded in a time-series mode includes a backup managing part configured to record partition data in a backup file in response to an input conditional clause, and a recovery processing part configured to recover a database by reading the backup file in a case of receiving a recovery instruction, wherein the partition data includes at least a part of time-series data and is classified from other partition data through a partition index to which a recording time of the at least a part of time-series data is applied.

10 Claims, 6 Drawing Sheets

DATA MANAGEMENT SYSTEM AND METHOD FOR BACKUP, RECOVERY, AND MOUNT OF TIME-SERIES DATA

CROSS-REFERENCE TO RELATED APPLICATIONS

A claim for priority under 35 U.S.C. § 119 is made to Korean Patent Application No. 10-2015-0149892 filed Oct. 28, 2015, in the Korean Intellectual Property Office, the entire contents of which are hereby incorporated by reference.

BACKGROUND

This work was supported by the Small and Medium Business Administration Grant funded by the Korean Government (S2220372).

Embodiments of the inventive concept described herein relate to technology for backup, recovery, and mount of a partition including a specific number of records that are recorded in a time-series mode.

Recording a large amount of data inevitably generates a large number of data files. For example, data of firewall equipment may generate records equal to or more than four billions per day.

These data could meet a storage limit of equipment because the equipment has its own storage capacity. While data generated in time-series mode needs to be partially retained in a storage space of equipment and old portions thereof need to be completely deleted or to be backed up into a less expensive reservoir for later retrieval.

During backup, it is efficient to back up only data that is coincident with desired time units.

For example, it is efficient to make only data of three-year volume accessible in an on-line network but to back up past-three-year data. However, such data management is accompanied with its difficulty in practice. Normally, much system resources may be inevitably spent to find past-three-year data from the whole data.

For that reason, backing up the whole data has used a general backup function while backing up only a part of data has used a data extracting function.

That is, backing up only a part of data may use export (an extracting tool) of data, whereas it is always required to extract data, which are to be backed up, by converting (generating) the data into a form of text.

Even in the process with such export of data, if there is a need of reading data, the data must be imported again into a database.

During the importing process, a data matching step is required to cause a processing time to be longer, hence being inefficient.

SUMMARY

Embodiments of the inventive concept provide a data management system and method for shortening a data backup and recovery time by supporting functions of backup, recovery, and mount by time for time-series data.

Embodiments of the inventive concept provide a data management system and method for allowing backup data to be accessible immediately using a mount function.

Embodiments of the inventive concept provide a data management system and method for allowing systemic management of past data through a day-by-day backup function and for allowing data to be searched by selecting desired days only in a smaller cost through a mount function.

A data management system according to an embodiment includes a backup managing part configured to record partition data in a backup file in response to an input conditional clause, and a recovery processing part configured to recover a database by reading the backup file in a case of receiving a recovery instruction, wherein the partition data includes at least a part of time-series data and is classified from other partition data through a partition index to which a recording time of the at least a part of time-series data is applied.

The backup managing part according to an embodiment may be configured to record the partition data in the backup file in relation with schema information of the database.

In a case that a part of records recorded in the partition data satisfies the input conditional clause, the backup managing part according to an embodiment may be configured to extract only the part of records and to record the extracted part of records in the backup file.

The backup managing part according to an embodiment may be configured to generate a backup index file with the extracted records.

In a case that all records recorded in the partition data satisfy the input conditional clause, the backup managing part according to an embodiment may be configured to extract the all records and to record the extracted records in the backup file.

The data management system according to an embodiment may further include a mount managing part configured to extract backup data, which is recoded in the backup file, and an index file for the backup data, in response to a mount instruction including a conditional clause, and to mount the extracted backup data and the index file in a spatial area of a database corresponding to the conditional clause.

A data management system according to an embodiment may include a backup managing part configured to record partition data in a backup file in response to an input conditional clause, and a mount managing part configured to mount partition data, which is recorded in the backup file, in an original spatial area of a database in a case of receiving a mount instruction.

The mount managing part according to an embodiment may be configured to extract backup data, which is recorded in the backup file, and an index file for the backup data, in response to a mount instruction, and to mount the extracted backup data and the index file in a spatial area of a database based on the mount instruction.

A data management method according to an embodiment includes recording partition data in a backup file in response to an input conditional clause, and recovering a database by reading the backup file in a case of receiving a recovery instruction, wherein the partition data includes at least a part of time-series data and is classified from other partition data through a partition index to which a recording time of the at least a part of time-series data is applied.

The recording of the partition data in the backup file according to an embodiment may include recording the partition data in the backup file in relation with schema information of a database.

In a case that a part of data recorded in the partition data satisfies the input conditional clause, the recording of the partition data in the backup file according to an embodiment may include extracting the part of data and recording the extracted data in the backup file.

In a case that all data recorded in the partition file satisfy the input conditional clause, the recording of the partition data in the backup file according to an embodiment may include extracting the all data and recording the extracted data in the backup file.

The data management method according to an embodiment may further include extracting backup data, which is recorded in a backup file, and an index file for the backup data in response to a mount instruction including a conditional clause, and mounting the extracted backup data and the index file in a spatial area of a database corresponding to the conditional clause.

A data management method according to an embodiment includes recording partition data in a backup file in response to an input conditional clause, and mounting partition data, which is recorded in the backup file, to an original spatial area of a database in a case of receiving a mount instruction.

The mounting according to an embodiment may include extracting backup data, which is recorded in a backup file, and an index file for the backup data in response to the mount instruction, and mounting the extracted backup data and the index file in a spatial area of a database based on the mount instruction.

A program according to an embodiment includes an instruction set configured to record partition data in a backup file, in response to an input conditional clause, and an instruction set configured to recover a database by reading the backup file, in a case of receiving a recovery instruction, wherein the partition data includes at least a part of time-series data and is classified from other partition data through a partition index to which a recording time of the at least a part of time-series data is applied.

A program according to an embodiment includes an instruction set configured to record partition data in a backup file, in response to an input conditional clause, and an instruction set configured to mount partition data, which is recorded in the backup file, to an original spatial area of a database, in a case of receiving a mount instruction.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Embodiments of the inventive concept may be variable in various forms and the scope of the inventive concept may not be construed as restricting the following embodiments. Other aspects, advantages, and salient features of the inventive concept will become apparent to those skilled in the art from the following detailed embodiments. Various embodiments described herein, however, may not be intentionally confined in specific embodiments, but should be construed as including diverse modifications, equivalents, and/or alternatives.

While the terms such as 'first' or 'second, and the like may be used to qualify various elements regardless of their order and/or priority, simply differentiating one from another, but do not limit those elements thereto. For example, a first element may be referred to as a second element and vice versa without departing from the scope of the inventive concept.

As used herein, if one element is referred to as being coupled with/to' or 'connected with/to', including its similar expressions, another element, it should be understood that the former may be directly coupled with the latter, or connected with the latter via an intervening element (e.g., a third element). Otherwise, it will be understood that if one element is referred to as being 'directly coupled with/to' or 'directly connected with/to' another element, it may be understood that there is no intervening element (e.g., a third element) existing between them. Additionally, expressions describing relations between elements, for example, 'between', 'directly between', or 'directly adjacent to', will be also construed in the same manner.

The terms used in this specification are just used to describe various embodiments of the inventive concept and may not be intended to limit the scope of the inventive concept. In the description, the terms of a singular form may also include plural forms unless otherwise specified. The terms 'include' or 'have' and its diverse inflections or conjugations, as used herein, may be construed such that any one of a feature, a number, a step, an operation, an element, a component, or a combination of them does not exclude presence or addition of one or more different constitutions, features, numbers, steps, operations, elements, components, or combinations of them.

Unless otherwise defined herein, all the terms used herein (including technical or scientific terms) may have the same meaning that is generally acceptable by universal technology in the related art of the inventive concept. It will be further understood that terms, which are defined in a dictionary and commonly used, may also be interpreted as is customary in the relevantly related art and/or as is same in the description of the present application. Even in the case of terminological expression with insufficient clarification, such terms may not be conceptualized or overly interpreted in formality.

Hereafter, embodiments of the inventive concept will be described in conjunction with the accompanied figures.

Figure 1:
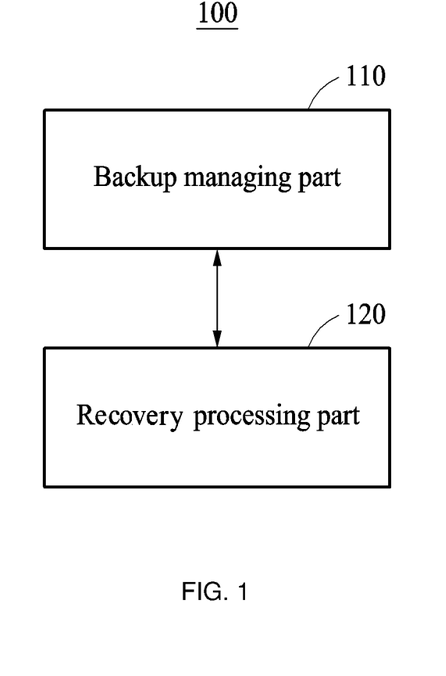
FIG. 1 is a diagram illustrating a data management system according to an embodiment.

FIG. 1 is a diagram illustrating a data management system according to an embodiment.

A data management system 100 according to an embodiment may shorten a backup and recovery time by assisting functions of backup, recovery, and mount by time for time-series data.

For this performance, the data management system 100 according to an embodiment may include a backup managing part 110 and a recovery processing part 120.

The backup managing part 110 may record partition data in a backup file in response to an input conditional clause.

The input conditional clause may include a specific period in which partition data is recorded. The backup managing part 110 may interpret partition data, which is recorded in a corresponding period in accordance with an input of the conditional clause, as an instruction to back up the partition data.

Meanwhile, partition data may include at least a part of time-series data and may be classified from other partition data through a partition index to which a recording time of the at least a part of time-series data is applied.

Partition data may be interpreted as data that is recorded in each of a plurality of partitions recording data, which is included in time-series data, in a time-series mode. For example, each partition of a plurality of partitions may record only partition data that are divided in a specific size from time-series data. For example, it may be permissible to sequentially record time-series data in a plurality of partitions in the unit of one gigabit, and to grant time information to partition data that is recorded in each partition.

A partition index may be an interval to which an input time of partition data is applied, and may include an identifier (e.g., a number, an alphabet, a special character, or a combination of them) that is used for uniquely identifying a corresponding one of several partitions or for identifying an order of the partitions.

For example, a partition index may be uniquely identified values every partition. Partition indexes may be also generated sequentially in a time-series mode to show that partitions are continuous in the time-series mode. As a detailed example, if a partition index granted to a first partition is 100, a partition index granted to a second partition may be 101.

The backup managing part 110 may back up a partition index together with partition data. During this, the backup managing part 110 may back up a partition as it is, and even may selectively back up a record which is included in a partition.

As an example, the backup managing part 110 may record partition data in a backup file in relation with schema information of a database. Schema information may be information for informing of which page include which column, i.e., for interpreting a backup file. By recording schema information of a database together with partition data, it may be permissible for the schema information to be used quickly during recovery.

The backup managing part 110 may back up data, which is fully included in a time portion, as it is, in a data file partitioned in the unit of a time, and may generate a new backup partition and backup file with a record, which satisfies a condition, in a partition including only a part of data.

For this backup management, the backup managing part 110 needs to first determine whether only a part of records recorded in partition data satisfies an input conditional clause. In the case that only a part of records recorded in partition data satisfies an input conditional clause, the backup managing part 110 may extract only the part of records, which satisfies the conditional clause and then may record the extracted part of records in a backup file.

Additionally, after the determination, in the case that all records recorded in partition data satisfy an input conditional clause, the backup managing part 110 may extract and record all records in a backup file.

Even in any case, the backup managing part 110 may generate a backup index file with extracted records. A generated backup index file has information to be used for quickly searching a backup file. A backup index file may be an interval to which a backup time is applied, and may include an identifier (e.g., a number, an alphabet, a special character, or a combination of them) which is used for uniquely identifying a corresponding one of several backup files or for identifying an order of backup files.

Next, the recovery processing part 120 may recover a database by reading the backup file in the case of receiving a recovery instruction.

During this, the recovery processing part 120 may read recorded backup files and may fully overwrite the backup files in a partition. That is, the recovery processing part 120 may recover partition data to a backup time.

Figure 2:
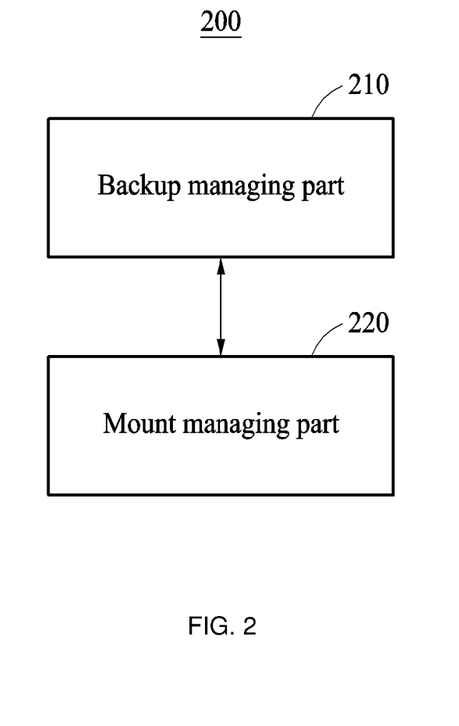
FIG. 2 is a diagram illustrating a data management system according to another embodiment.

FIG. 2 is a diagram illustrating a data management system according to another embodiment.

A data management system 200 according to this embodiment may immediately access backup data using a mount function. Additionally, the data management system 200 may systemically manage old data through a day-by-day backup function, and may selectively search only data of desired days in a smaller cost through a mount function.

For this data management, the data management system 200 according to an embodiment may include a backup managing part 210 and a mount managing part 220.

The backup managing part 210 may first record partition data in a backup file in response to an input conditional clause. As also, an input conditional clause may include a specific period in which partition data is recorded, and the backup managing part 210 may interpret the conditional clause as an instruction to back up partition data which is recorded in the specific period.

The backup managing part 210 may back up even an index together with partition data. During this, the backup managing part 210 may back up a partition as it is, and even may selectively back up a record which is included in a partition.

For example, the backup managing part 210 may back up data, which is fully included in a desired time portion, as it is, in a data file partitioned in the unit of a time, and may generate a new backup partition and backup file with a record, which satisfies a condition, in a partition including only a part of data. For this backup management, the backup managing part 210 needs to first determine whether only a part of records recorded in partition data satisfies an input conditional clause. In the case that only a part of records recorded in partition data satisfies an input conditional clause, the backup managing part 210 may extract only the part of records, which satisfies the conditional clause and then may record the extracted part of records in a backup file. After the determination, in the case that all records recorded in partition data satisfy an input conditional clause, the backup managing part 210 may extract and record all records in a backup file.

Next, the mount managing part 220 may allow a generated backup file to be immediately searched as being included in a part of a database which is currently in operation.

In detail, the mount managing part 220 according to this embodiment may extract backup data, which is recorded in a backup file, and an index file for the backup data in response to a mount instruction that includes a conditional clause. Additionally, the mount managing part 220 may mount an index file and extracted backup data in a spatial area of a database corresponding to a conditional clause.

The mount managing part 220 may allow backup data to be accessed immediately. Additionally, it may be permissible to systemically manage past data through a day-to-day backup function and to efficiently search only data of a desired day through the mount managing part 220.

The mount managing part 220 may immediately mount a data file in a partition without a change of a database such as an additional format change. As data files maintain an index even after backup, it may be permissible to immediately mount the data files and to access data without additional delays in the case of receiving a request for mount thereafter.

Figure 3:
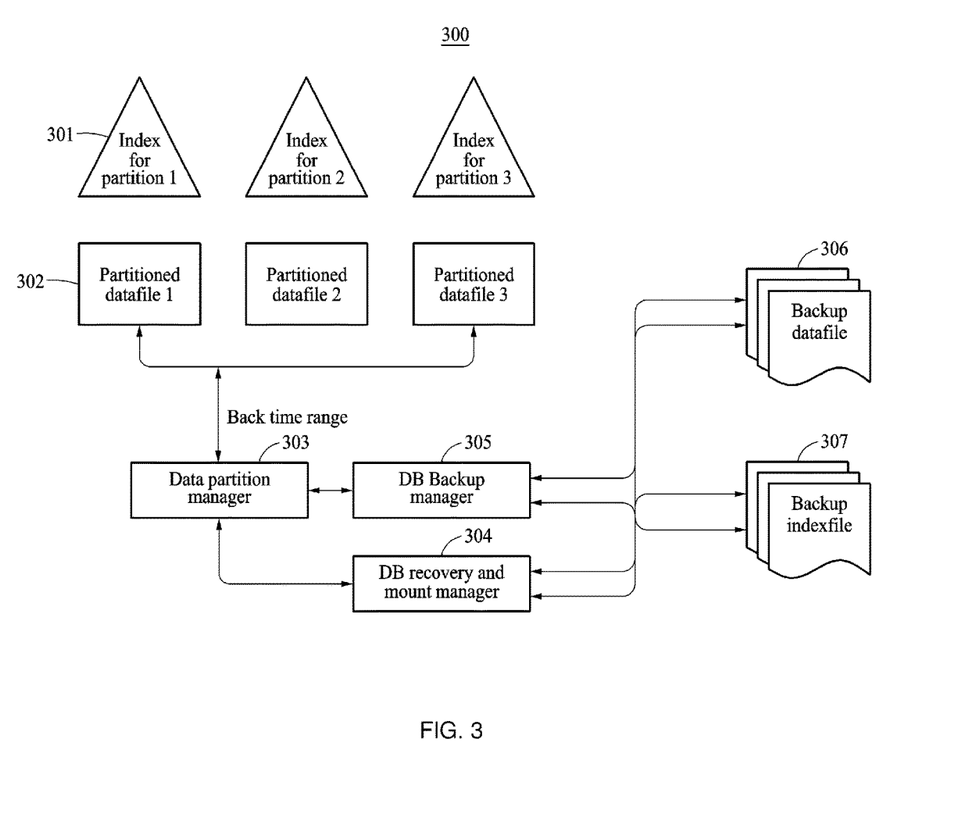
FIG. 3 illustrates an embodiment showing a structure of an overall system configured with a data management system according to an embodiment.

FIG. 3 illustrates an embodiment showing a structure of an overall system 300 configured with a data management system according to an embodiment.

In the overall system 300, a data file 302 partitioned from time-series data may be recorded in each partition. The data files 302 may be uniquely identified through a partition index 301.

A data partition manager 303 may monitor which data of a database is included in which partition, and may manage backup, recovery, and mount for data files through a database backup manager 305 and a database recovery/mount manager 304.

The database backup manager 305 may back up data, which is fully included in a desired time portion, as it is, in data files with reference to an input conditional clause, and may extract only a record, which satisfies a condition, in a partition including a part of data and then may back up the extracted record.

For this backup management, the database backup manager 305 needs to determine whether only a part of records recorded in partition data satisfies an input conditional clause.

A data file may be recorded in a backup data file 306 and a backup index file 307 may be recorded in relation with the backup data file 306 to identify each data file.

The backup data file 306 may be recovered or mounted through the database recovery/mount manager 304.

For example, the database recovery/mount manager 304 may extract a data file, which corresponds to an input conditional clause, from a backup data file 306 and then may perform a recovery or mount function for a partition by using the extracted data file.

Figure 4:
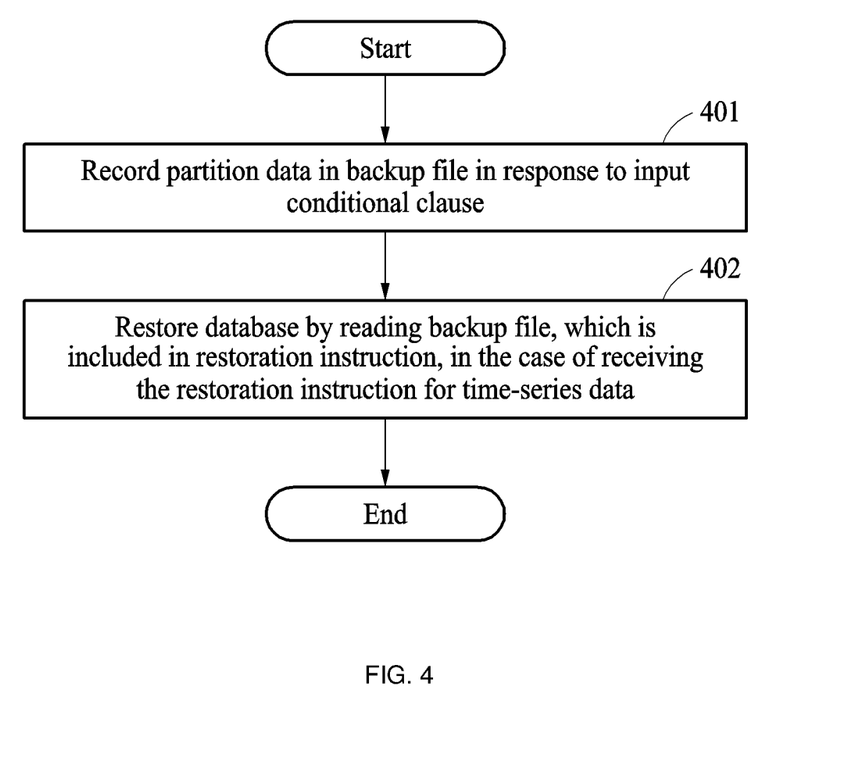
FIG. 4 is a diagram showing a data management method according to an embodiment.

FIG. 4 is a diagram showing a data management method according to an embodiment.

A data management method according to an embodiment may record partition data in a backup file in response to an input conditional clause (step 401).

A data management method according to an embodiment may recover a database by reading a backup file, which is included in a recovery instruction, in the case of receiving the recovery instruction for time-series data (step 402).

A detailed process of recording partition data in a backup file will be described in conjunction with FIG. 5.

Figure 5:
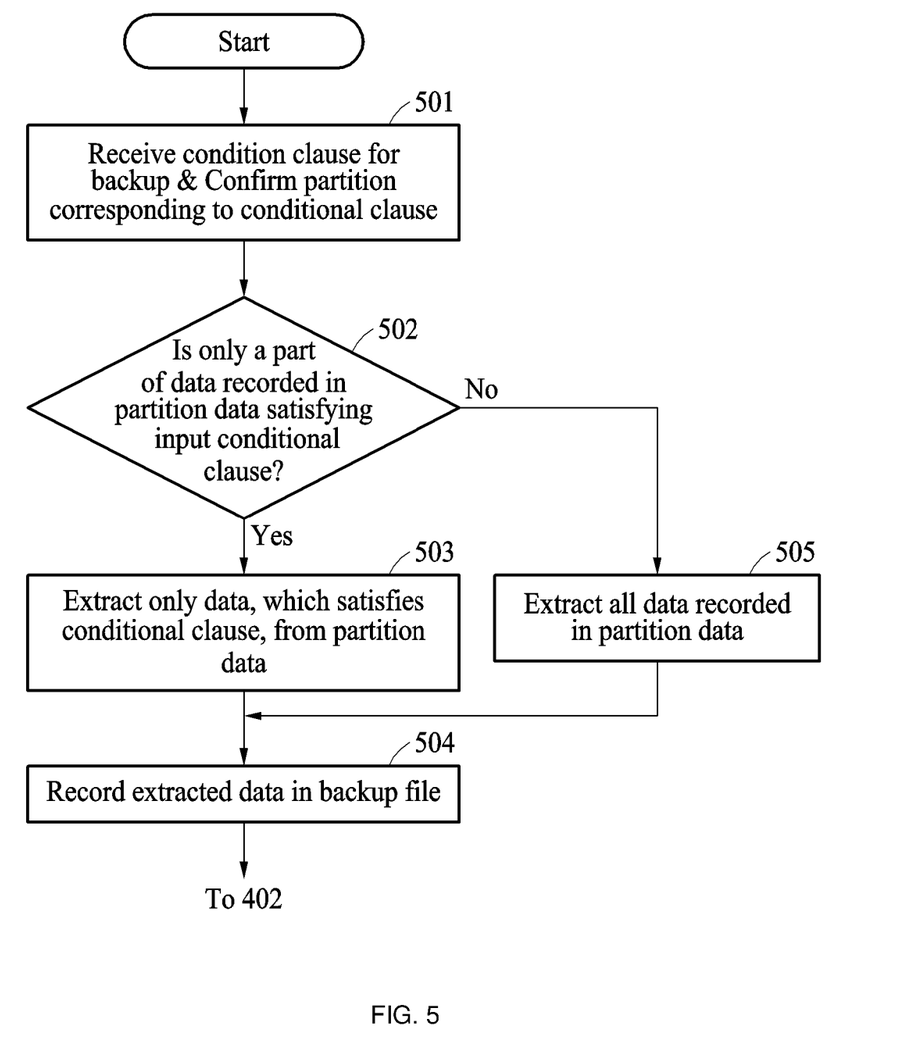
FIG. 5 is a diagram showing a process of recording partition data in a backup file.

FIG. 5 is a diagram showing a process of recording partition data in a backup file.

In the case of receiving a conditional clause for backup, a data management method according to an embodiment may confirm a partition corresponding to the conditional clause (step 501).

For example, a conditional clause may include specific period information. Additionally, since a partition may be recorded with a specific number of records, the partition may include the first and last records of the specific number of records. Since each partition may be recorded with time information, which corresponds to an instant when a record is recorded, together with each record, time information of the first recorded record and time information of the last recorded record may be granted to each partition. That is, the step 501 may search a partition, which accords to time information included in a conditional clause based thereon.

Next, a data management method may determine whether only a part of data recorded in partition data satisfies an input conditional clause (step 502).

As an input conditional clause represents a time period, it may be compared to a time period in which a record of partition data is recorded. If a time period, in which a record of partition data is recorded, is included in an input conditional clause as it is, it may be permissible to extract the record of the corresponding partition data as it is. Meanwhile, it may be also allowable to consider even a case of partial overlap between a record of partition data and a recorded time period.

For this, a data management method needs to determine through the step 502 whether only a part of data recorded in partition data satisfies an input conditional clause.

After the determination of the step 502, if only a part of data recorded in partition data satisfies the input conditional clause, the data management method may extract only the data, which satisfies the conditional clause, from the partition data (step 503) and then may record the extracted data in a backup file (step 504).

Additionally, after the determination of the step 502, if only a part of data recorded in partition data does not satisfy the input conditional clause, the data management method may extract all records, which are recorded in the partition data, from the partition data (step 505) and then may record the extracted data in a backup file (step 504).

Figure 6:
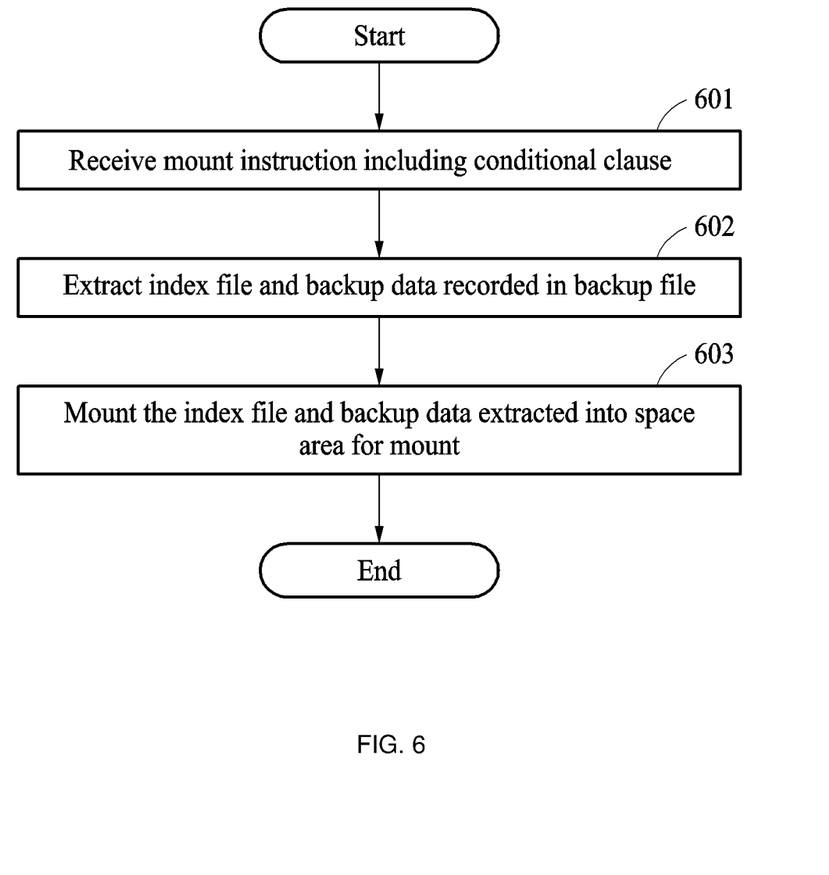
FIG. 6 is a diagram is a diagram showing an embodiment of mount for a backup file according to an embodiment.

FIG. 6 is a diagram is a diagram showing an embodiment of mount for a backup file according to an embodiment.

A data management method according to an embodiment may receive a mount instruction that includes a conditional clause (step 601). A conditional clause may include information about a time period in which data to be mounted is recorded.

Next, the data management method may extract an index file and backup data which are recorded in a backup file (step 602). For example, the data management method may read and extract an index file and backup data through a mount manager.

Next, the data management method may mount the index file and the extracted backup data in a spatial area for mount (step 603). For example, the data management method may add backup files to a portion at which backup data is placed in a spatial area of a partition manager of a database which is currently in operation. During this, if old data exists in the same area, backup files may not be added thereto.

A data management method according to an embodiment may perform a mount function in several times by repeating a step of adding backup files even with a number of mounts in several backup courses. It may be permissible for even data, which exists in a backup area by a mount manager, to be searched during a search.

Consequently, according to embodiments of the inventive concept, it may be allowable to shorten a backup and recovery time by assisting functions of backup, recovery, and mount by time for time-series data. Additionally, it may be permissible to immediately access backup data using a mount function, to systemically manage old data through a day-by-day backup function, and to selectively search only data of a desired day in a smaller cost through a mount function.

An apparatus described above may be implemented in hardware elements, software elements, and/or a combination of hardware and software elements. For example, an apparatus, unit, or element described above may be implemented with one or more universal or special computers, such as processor, controller, Arithmetic Logic Unit (ALU), digital signal processor, microcomputer, Field Programmable Gate Array (FPGA), Programmable Logic Unit (PLU), microprocessor, or other units capable of executing and responding instructions. A processing unit may perform an Operating System (OS) and one or more software applications executed in the OS. Additionally, a processing unit may access, store, control, process, and generate data in response to software executions. Although some embodiment is illustrated as employing one processing unit for convenience of understanding, it can be seen by those skilled in the art that a plurality and/or diversity of processing elements may be included in use. For example, a processing unit may include a plurality of processors or one processor and one controller. Additionally, a processing unit may be formed in other processing configuration like a parallel processor.

Software may include computer programs, codes, instructions, or one or more combinations with them, may configure a processing unit, or may instruct a processing unit independently or collectively. For being interpreted by a processing unit or for providing instructions or data to a processing unit, software and/or data may be embodied permanently or temporarily in some kind of machine, component, physical apparatus, virtual equipment, computer storage medium or unit, or transmitted signal wave. Software may be distributed in computer systems connected through a network and may be stored and executed in distribution. Software and data may be stored in one or more computer-readable recording media.

Methods according to embodiments of the inventive concept may be implemented in the form of program instructions executable through diverse computing means and may be recorded in computer readable media. The computer readable media may include independently or associatively program instructions, data files, data structures, and so on. Program instructions recorded in the media may be specially designed and configured for embodiments, or may be generally known by those skilled in the computer software art. Computer readable recording media may include magnetic media such as hard disks and floppy disks, magnetic tapes, optical media such as CD-ROM and DVD, magneto-optical media such as floptical disks, and hardware units, such as ROM, RAM, flash memory, and so on, which are intentionally formed to store and perform program instructions. Program instructions may include high-class language codes executable by computers using interpreters, as well as machine language codes likely made by compilers. The hardware units may be configured to function as one or more software modules for performing operations according to embodiments of the inventive concept, and vice versa.

According to embodiments, it may be allowable to shorten a backup and recovery time by supporting functions of backup, recovery, and mount by time for time-series data.

According to the inventive concept, it may be allowable for backup data to be accessible immediately using a mount function.

According to the inventive concept, it is allowable to perform systemic management of past data through a day-by-day backup function and to search data by selecting desired days only in a smaller cost through a mount function.

While embodiments of the inventive concept have been shown and described with reference to the accompanying drawings thereof, it will be understood by those skilled in the art that various changes and modifications in form and details may be made therein without departing from the spirit and scope of the inventive concept as defined by the appended claims and their equivalents. For example, it may be allowable to achieve desired results although the embodiments of the inventive concept are performed in other sequences different from the descriptions, and/or the elements, such as system, structure, device, circuit, and so on, are combined or assembled in other ways different from the descriptions, replaced or substituted with other elements or their equivalents.

What is claimed is:

1. A data management system implemented by a computing terminal, the data management system comprising:
    a backup managing part configured to record at least a part of partition data in a backup file in response to an input conditional clause including a first time period; and
    a recovery processing part configured to recover a database by reading the backup file in a case of receiving a recovery instruction,
    wherein the partition data includes time-series data and is classified from other partition data through a partition index to which a recording time of the time-series data is applied, the recording time of the time-series data indicating a second time period in which the time-series data was recorded, and
    wherein the first time period included in the input conditional clause and the second time period indicated by the recording time are at least partially overlapped with each other.

2. The data management system of claim 1, wherein the backup managing part is configured to record the partition data in the backup file in relation with schema information of the database.

3. The data management system of claim 1, wherein in a case that a part of records recorded in the partition data satisfies the input conditional clause, the backup managing part is configured to extract only the part of records and to record the extracted part of records in the backup file.

4. The data management system of claim 3, wherein the backup managing part is configured to generate a backup index file with the extracted records.

5. The data management system of claim 1, wherein in a case that all records recorded in the partition data satisfy the input conditional clause, the backup managing part is configured to extract the all records and to record the extracted records in the backup file.

6. The data management system of claim 1, further comprising a mount managing part configured to extract backup data, which is recorded in the backup file, and an index file for the backup data, in response to a mount instruction including a conditional clause, and to mount the extracted backup data and the extracted index file in a spatial area of a database corresponding to the conditional clause.

7. A data management system configured by a computing terminal, the data management system comprising:
    a backup managing part configured to record partition data in a backup file in response to an input conditional clause including a first time period; and
    a mount managing part configured to mount partition data, which is recorded in the backup file, in an original spatial area of a database in a case of receiving a mount instruction,
    wherein the partition data includes a plurality of records and time information of the plurality of records, the time information indicating a second time period in which the plurality of records was recorded, and
    wherein the first time period included in the input conditional clause and the second time period indicated by the recording time are at least partially overlapped with each other.

8. The data management system of claim 7, wherein the mount managing part is configured to extract backup data, which is recorded in the backup file, and an index file for the backup data, in response to a mount instruction, and to mount the extracted backup data and the extracted index file in a spatial area of a database based on the mount instruction.

9. A data management method configured by a computing terminal, the data management method comprising:

recording at least a part of partition data in a backup file in response to an input conditional clause including a first time period; and recovering a database by reading the backup file in a case of receiving a recovery instruction, wherein the partition data includes time-series data and is classified from other partition data through a partition index to which a recording time of the time-series data is applied, the recording time of the time-series data indicating a second time period in which the time-series data was recorded, and wherein the first time period included in the input conditional clause and the second time period indicated by the recording time are at least partially overlapped with each other.

10. The data management method of claim 9, wherein the recording of the partition data in the backup file comprises recording the partition data in the backup file in relation with schema information of a database.

* * * * *